United States Patent
Steyl et al.

(10) Patent No.: US 10,850,992 B2
(45) Date of Patent: Dec. 1, 2020

(54) ENHANCED EVAPORATION SYSTEM

(71) Applicant: Vapteq IP Pty Ltd, Brisbane (AU)

(72) Inventors: Gideon Steyl, Brisbane (AU); David C. Macfarlane, Brisbane (AU); Philip Fouche, Brisbane (AU)

(73) Assignee: Vapteq IP Pty Ltd, Brisbane (AU)

( * ) Notice: Subject to any disclaimer, the term of this patent is extended or adjusted under 35 U.S.C. 154(b) by 12 days.

(21) Appl. No.: 16/318,079

(22) PCT Filed: Jul. 14, 2017

(86) PCT No.: PCT/AU2017/050732
§ 371 (c)(1),
(2) Date: Jan. 15, 2019

(87) PCT Pub. No.: WO2018/009982
PCT Pub. Date: Jan. 18, 2018

(65) Prior Publication Data
US 2020/0123022 A1 Apr. 23, 2020

(30) Foreign Application Priority Data
Jul. 15, 2016 (AU) .................... 2016902780

(51) Int. Cl.
*C02F 1/14* (2006.01)
*B01D 1/00* (2006.01)
*B01D 5/00* (2006.01)
*C02F 1/04* (2006.01)
*C02F 103/10* (2006.01)
*C02F 103/36* (2006.01)

(52) U.S. Cl.
CPC .............. *C02F 1/14* (2013.01); *B01D 1/0005* (2013.01); *B01D 5/006* (2013.01); *C02F 1/043* (2013.01); *C02F 1/048* (2013.01); *C02F 2103/10* (2013.01); *C02F 2103/365* (2013.01)

(58) Field of Classification Search
CPC . C02F 1/14; C02F 1/043; C02F 1/048; B01D 1/0005; B01D 5/006
See application file for complete search history.

(56) References Cited

U.S. PATENT DOCUMENTS

| | | | |
|---|---|---|---|
| 2,820,744 A * | 1/1958 | Lighter | C02F 1/14 202/234 |
| 3,279,527 A | 10/1966 | Hardy | |
| 3,351,536 A * | 11/1967 | Fox | C02F 1/14 202/83 |
| 3,440,146 A * | 4/1969 | Louw | C02F 1/08 203/11 |

(Continued)

OTHER PUBLICATIONS

International Search Report issued in International Application No. PCT/AU2017/050732 dated Aug. 24, 2017 (4 pages).

(Continued)

*Primary Examiner* — Jonathan Miller
(74) *Attorney, Agent, or Firm* — Osha Bergman Watanabe & Burton LLP (57) ABSTRACT

An evaporation system including a reservoir, for receiving a liquid mixture to be reduced through evaporation; and a tray, for being received in the reservoir, the tray defining a heating chamber into which the liquid from the reservoir may flow, the heating chamber configured to heat the liquid therein to increase evaporation of the liquid.

51 Claims, 3 Drawing Sheets

(56) References Cited

U.S. PATENT DOCUMENTS

| | | | | |
|---|---|---|---|---|
| 3,501,381 A | | 3/1970 | Delano | |
| 3,960,668 A | * | 6/1976 | Rush | C02F 1/14 202/185.1 |
| 3,986,936 A | * | 10/1976 | Rush | C02F 1/14 202/234 |
| 4,151,046 A | * | 4/1979 | Eidelberg | C02F 1/14 202/180 |
| 4,172,767 A | * | 10/1979 | Sear | C02F 1/047 202/182 |
| 4,219,387 A | * | 8/1980 | Gruntman | B01D 1/0005 202/182 |
| 4,363,703 A | * | 12/1982 | ElDifrawi | B01D 3/346 203/10 |
| 4,504,362 A | * | 3/1985 | Kruse | C02F 1/14 203/3 |
| 4,693,304 A | * | 9/1987 | Volland | B01D 1/04 165/88 |
| 5,645,693 A | * | 7/1997 | Gode | B01D 1/0082 202/173 |
| 6,494,995 B1 | * | 12/2002 | Battah | B01D 1/0005 202/234 |
| 7,067,044 B1 | * | 6/2006 | Coon | B01D 1/0005 203/10 |
| 8,256,748 B1 | | 9/2012 | Boulter | |
| 8,808,497 B2 | * | 8/2014 | Duesel, Jr. | B01D 1/0005 159/16.1 |
| 9,468,863 B2 | * | 10/2016 | Roth, Jr. | C02F 1/14 |
| 9,943,774 B2 | * | 4/2018 | Duesel, Jr. | B01D 1/0005 |
| 10,093,553 B1 | * | 10/2018 | Stefan | C02F 1/14 |
| 2004/0084357 A1 | * | 5/2004 | Nagler | B01D 1/28 210/85 |
| 2008/0110417 A1 | * | 5/2008 | Smith | B01D 1/0058 122/379 |
| 2013/0248122 A1 | * | 9/2013 | Duesel, Jr. | B01D 1/0005 159/16.1 |
| 2014/0311684 A1 | * | 10/2014 | Duesel, Jr. | B01D 1/0005 159/16.2 |
| 2015/0353378 A1 | * | 12/2015 | Gawlik | C02F 1/10 159/47.3 |

OTHER PUBLICATIONS

Written Opinion issued in International Application No. PCT/AU2017/050732 dated Aug. 24, 2017 (4 pages).

* cited by examiner

ENHANCED EVAPORATION SYSTEM

TECHNICAL FIELD

The present invention relates to the accelerated evaporation of fluids. In particular, although not exclusively, the present invention relates to evaporation of a water component from mineralised water, or water with organic components and/or mineralised or organic slurries.

BACKGROUND ART

The mining and energy sectors (power generation, coal seam gas (CSG), conventional gas and oil) are generally responsible for producing large volumes of mineralised water in the form of mine tailings decant water, waste water from discard areas, open pit voids, process water, naturally occurring on site water, water from CSG production, dewatering of underground mining operations and coal beneficiation operations. As this water has varying levels of hyper-mineralisation/contamination, specific State/Territory/National government environmental regulations control the management, potential beneficial use and waste water management including the disposal and discharge of variously concentrated wastes.

The gathering, primary treatment and secondary waste water treatment, transport and long-term storage of these waters is generally very expensive. Furthermore, environmental risks may be associated with long term storage of such waste water on site.

Similar problems are faced in other areas, such as municipal waste management, agro-industry and other industrial applications, where organic matter with very high water content is typically transported where it can be used subject to environmental regulations/guidelines for beneficial use. In particular, the transport and storage of high water content organic matter is costly and inefficient.

Certain attempts have been made to concentrate (i.e. reduce the water content of) such organic matter and mineralised water. However, such systems are generally expensive and/or inefficient to operate.

Accordingly, there is clearly a need for improved evaporation systems.

It will be clearly understood that, if a prior art publication is referred to herein, this reference does not constitute an admission that the publication forms part of the common general knowledge in the art in Australia or in any other country.

SUMMARY OF INVENTION

The present invention is directed to evaporation systems, which may at least partially overcome at least one of the abovementioned disadvantages or provide a preferred commercial choice.

With the foregoing in view, the present invention in one form, resides broadly in an evaporation system including:

a reservoir, for receiving a liquid mixture to be reduced through evaporation; and a tray, for being received in the reservoir, the tray defining a heating chamber into which the liquid from the reservoir may flow, the heating chamber configured to heat the liquid therein to increase evaporation of the liquid.

Advantageously, the system provides a fast and cost effective way of evaporating liquid, which as a result, may be safer for the environment, and decrease transport, storage and disposal costs associated with the liquid mixture.

The liquid mixture may comprise a saline solution. The saline solution may comprise a range of cations and anions, some of which may be environmental contaminants, which may be subject to regulated management conditions. The liquid mixture may comprise water including salts in solution and in solid state.

Alternatively, the liquid mixture may comprise a mixture of water and organic matter. The liquid mixture may further include water, organic matter and one or more salts.

The reservoir may comprise a dam, a tank, a pool or a natural system that can contain water. The reservoir may be outdoors. Alternatively, the reservoir may be located indoors. In such case as well with suitably sized outdoor tanks, heating chamber may be configured to heat the liquid either directly or indirectly by solar radiation.

The reservoir may have a surface area of more than 100 m$^2$. The reservoir may have a surface area of more than 1,000 m$^2$. The reservoir may have a surface area of more than 10,000 m$^2$. The reservoir may have a surface area of more than 150,000 m$^2$.

Preferably, the heating chamber is configured to heat the liquid therein using solar radiation. The solar radiation may heat the liquid directly, or indirectly.

Preferably, the heating chamber comprises a solar thermal collector configured to heat the liquid. The solar thermal collector may be submerged in the liquid, to heat the liquid directly. In such case, the solar thermal collector may be submerged at varying depths.

The solar thermal collector may comprise a surface of the heating chamber. The solar thermal collector may comprise a base and/or sidewalls of the heating chamber.

The solar thermal collector may comprise a plurality of fins, extending upwardly from a base of the heating chamber.

Preferably, the solar thermal collector comprises a dark, solar absorbing surface of the heating chamber.

The heating chamber may be formed of dark material such that the heating chamber itself defines the solar thermal collector. Alternatively, the heating chamber may be coated with a dark material to define the solar thermal collector on a surface thereof.

The heating chamber may be shallow. Preferably, the heating chamber is longer than it is deep. Preferably, the heating chamber is wider than it is deep. Preferably the heating chamber is longer and wider than it is deep. Preferably, the heating chamber is less than about 10 cm deep. Suitably, the heating chamber may be less than about 5 cm deep. The heating chamber may be less than about 1 cm deep.

Preferably, the heating chamber includes an outlet, for allowing crystalline material, particles or concentrated liquid to escape from the heating chamber. The outlet may be coupled back to the reservoir.

Preferably, the heating chamber includes an inlet for receiving liquid from the reservoir. The inlet may be on a side of the heating chamber. The outlet may be on a lower portion of the heating chamber. The outlet may be configured to direct crystalline material, particles or concentrated liquid towards a base of the reservoir.

The heating chamber may be configured to guide crystalline material or solids towards the outlet. A base of the heating chamber may be angled towards the outlet.

Preferably, the tray is configured to float in the liquid in the reservoir.

Preferably, the tray includes floating elements. Preferably, the tray includes a ballast element, to provide stability to the tray in the liquid.

Preferably, the system includes retainers, for keeping the trays in place in the reservoir. The retainers may comprise retaining wires, piping, rope that extend across the reservoir. The rope may be fit for purpose all weather rope that meets engineering specifications in relation to 90+ percentile wind strengths and durations (e.g. marine standard ropes).

The heating chamber may be defined by outer walls of the tray. The heating chamber may comprise substantially an entire content of the tray.

The tray may comprise a substantially planar base. The base may be angled downwards towards a centre of the heating chamber.

Preferably, the system comprises a plurality of trays.

Preferably, the system includes a heater, for heating the liquid. The heater may be configured to heat the liquid through recirculation. The heater may be configured to pre-heat the liquid.

The heater may be configured to heat liquid in heating chamber.

The heater may be configured to store thermal energy, and use the thermal energy at a later time.

The heater may comprise a network of small diameter tubes/piping. Alternatively or additionally, the heater may comprise a solar heat sink. Alternatively or additionally, the heater may comprise a high energy storage alumina concrete block. The heater may be configured to be augmented by a solar or geothermal energy supply.

The heater may be configured to provide additional energy during daylight hours, however the integration of a solar heat sink with energy storage may provide heat during the day and/or the night time period.

The system may include an aerator, aerating the liquid. The aerator may be configured to provide ambient air to the heating chamber for adding kinetic energy to water at the liquid/atmosphere interface in the heating chamber. The aerator may be configured to enhance evaporation from the tray by promoting convectional movement of the tray entrained liquid as well as increasing the surface area of evaporating liquid film at the water surface.

The aerator may comprise a device to produce air at pressures elevated above ambient or atmospheric pressure, configured to pump air into the water. The device may be coupled to one or more tubes, including apertures from which the air may escape to form bubbles.

The system may comprise a concentrate removal module, configured to remove concentrate from the reservoir. The concentrate removal module may be configured to remove concentrate from the floor of the reservoir. The concentrate removal module may comprise one or more high density pipes which remain on the reservoir floor configured to remove the concentrate by suction. Alternatively, the concentrate removal module may include mechanical removal systems, such as dredges or auger devices.

According to certain embodiments, the system includes a roof, for preventing rainwater from entering the reservoir. The roof is preferably transparent, allowing high transmission of solar radiation whilst being robust and secure in all thermal, rainfall, hail and wind conditions.

According to certain embodiments, the system includes a cover, for covering the reservoir. The cover may enclose the reservoir. The system may include a vapour removal module, for removing vapour. The system may include a vapour condensation module, for condensing the vapour for later beneficial use.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
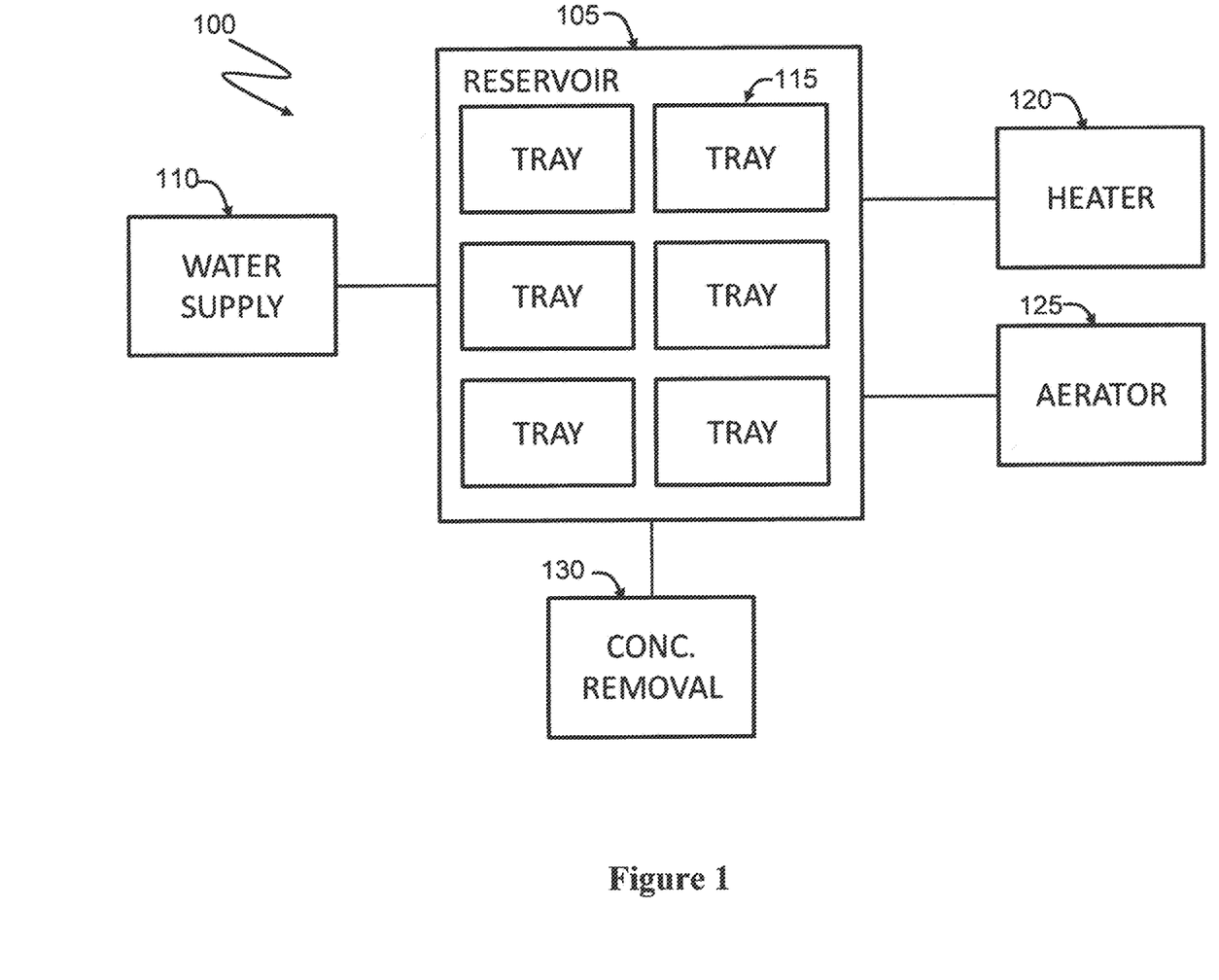
FIG. 1 illustrates an evaporation system, configured to reduce a water content of mineralised water, according to an embodiment of the present invention.

FIG. 1 illustrates an evaporation system 100, configured to reduce a water content of mineralised water, according to an embodiment of the present invention. The system 100 will be described below with reference to mineralised water, however the skilled addressee will readily appreciate that the system, or modified versions thereof, may be used with any suitable liquid, sludge or slurry.

The evaporation system 100 includes a reservoir 105, for receiving the mineralised water from a water supply 110. The reservoir 105 is generally outdoors, and may comprise a structure that is either natural or constructed (a dam, a tank, a pool), and is configured to receive relatively large amounts of fluid. As an illustrative example, the system 100 may include reservoirs having more than 10,000 m$^2$ (1 ha) surface area. In the mining area, reservoirs 105 having of up to 500,000 m$^2$ (50 ha) surface area are envisaged, and in the coal seam gas area, reservoirs 105 having of up to 500,000 m$^2$ (50 ha) surface area are envisaged.

In some embodiments, the reservoir 105 comprises a plurality of relocatable tanks. This enables the system to be manufactured to a large extent off site. Furthermore, relocatable tanks enable the system to be easily moved, e.g. between mine sites or areas of a mine, as the need arises.

The reservoir 105 preferably has a non-permeable base, such as a base formed from impermeable or semi-impermeable material, to prevent the mineralised water from leaching out of the reservoir 105 and into the environment. This is particularly important in case the mineralised water containing contaminants that are harmful to the environment.

The water supply 110 may, for example, be the source of mineralised water directly (e.g. a mine system), another reservoir, or a pre-treatment system, which is configured to pre-treat the mineralised water.

The evaporation system 100 includes a plurality of trays 115, configured to float in the mineralised water, to enhance evaporation of the water in the reservoir 105. In particular, a base portion of the tray 115 defines a heating chamber, for heating the mineralised water therein to enhance its evaporation.

In use, a shallow depth of water is retained in the heating chamber, which is dark in colour, and thus adapted to capture solar energy and thereby heat the water. The heating chamber is longer and wider than it is deep, to provide a large, yet shallow heating chamber while providing a structure which is easily secured in the reservoir and stable against wind of any strength from any direction. Typically, the depth of the heating chamber is less than about 10 cm, and may be less than about 5 cm deep, or in some cases less than about 1 cm deep. As a result, the water in the heating chamber is heated to a higher temperature than water in the reservoir 105 generally, which provides increased evaporation in the trays 115.

As described in further detail below, water is able to enter the trays 115, e.g. from the side of the tray 115, to replace water that has evaporated. Crystalline materials which form as a result of the evaporation are also able to exit a lower portion of the tray, and thus migrate downwards to the bottom of the reservoir. Hypersaline brine/crystalline materials exiting port 250 may be funneled directly to the reservoir floor in order to concentrate waste at reservoir floor suction network, described in further detail below, for efficient sludge pumping to allied systems which may encapsulate solid or near-solid wastes. In particular, the tray is generally configured to guide the crystalline material towards an opening which is formed in the base of a tray.

The trays 115 are advantageously held in place by retainers, to prevent the trays from moving in the reservoir 105. In some embodiments, retaining wires/ropes and piping extend across the reservoir, and are coupled to the trays 115, to retain the trays.

A heater 120 is provided to heat the mineralised water in the reservoir. The heater 120 may be configured to recirculate the water through, for example, a solar driven water heating system, or pre-heat mineralised water coming from the water supply 110, or both. As a result, the water in the heating chamber of the trays 115 has a higher initial temperature, which results in a higher final temperature, and thus increased evaporation rates.

The heater 120 may be configured to heat water in the trays. This may be achieved through recycling solar water heating systems adjacent to the reservoir, where water is heated outside of the tray and then returned to the trays, or directly (e.g. by a heat transfer element in the tray).

The heater 120 is preferably based upon renewable energy, such as solar or geothermal energy, or recycled energy, e.g. from exhaust or engine heat from other nearby processes. The heater 120 is configured to transfer heat into the water using tubing, channels, solid conductors or piping.

According to certain embodiments, the heater 120 is configured to store thermal energy, and reuse the thermal energy at a later time. For example, the heater(s) may be configured to be heated during the daytime, when solar energy inputs occur and when temperatures are warmer, and/or to heat the water during night time, when temperatures are colder. Where system evaporation efficiency over an extended period is promoted by minimising diurnal fluctuations in tray and total reservoir water temperatures then heating management would ensure optimal day time and night time water heating.

An example of a suitable heater 120 in such case is a solar heat sink, which is configured to be heated during the day, by the sun, and retain its heat, for use during the night.

According to certain embodiments, additives may be added to the water to increase heat conductivity. In particular, various inorganic and organic compounds may be added to the water to increase the heat conductive properties of the water, and to provide more efficient transfer of heat to the water.

The system 100 further includes an aerator 125, for aerating (bubbling) the mineralised water. The aerator 125 may comprise a device configured to deliver air at pressures elevated above ambient/atmospheric pressure, configured to deliver air into the water through a series of tubes, the tubes including small holes from which the air may escape to form bubbles.

As described in further detail below, the aerator is preferably configured to aerate the water in the heating chamber of the trays 115. In such case, the tubes may extend across trays, and be configured to aerate water at a specified distance from the liquid surface.

The aeration (bubbles) enhance evaporation from the tray by promoting movement of the warm shallow tray water, and increasing the evaporative area of the water surface/atmosphere interface and by increasing the energy with which vapour enters the atmosphere.

The aerator 125 may be configured to operate continuously, or intermittently. Similarly, the aerator 125 may be configured to operate during daytime, but not during the night time, according to environmental conditions, such as temperature, or according to times specified by an operator.

Finally, the system 100 includes a concentrate removal module 130, configured to remove concentrated brine or crystalline material from the reservoir. A client's salinized/mineralised waste water management system might require: a) the reservoir level being held constant or b) for reservoirs to be progressively emptied with sludge removed appropriately and then refilled or c) with no sludge removed but evaporated to near dryness and then refilled and the process repeated until the brine/waste dam is full of dry/near dry waste when the whole reservoir is encapsulated. The concentrate removal module 130 may operate sequentially or continuously across the reservoir floor, will enable system 100 to operate continuously. In some cases an operator may wait until a critical minimum volume of concentrated brine/crystalline sludge material has accumulated on the floor before removal.

As described in further detail below, the concentrate removal module 130 comprises a recommended suction pipe network at the base of reservoir 105, through which the concentrated brine is removed. The concentrate removal module 130 may be configured to operate continuously, periodically, or as required.

As mentioned above, the system 100 may be configured to reduce water content of organic matter. In such a case, the concentrate removal module may comprise a dredging unit, an auger or powerful slurry suction pump, or other suitable means for removing organic matter from the reservoir. Whereas salinized/mineralised water wastes may be continuously feed into reservoirs, organic wastes are advantageously evaporated in batches taking influent wastes of 3-5% dry matter down to at least 40% dry matter before applying other complementary dewatering processes.

According to certain embodiments, the system 100 includes a covering system or a clear roof (not illustrated), configured to cover the reservoir 105. The roof may prevent rainfall from entering organic waste reservoir and small salinized or mineralised waste reservoirs. This will reduce the overall amount of liquid needing to be evaporated. The roof may be free standing, or floating on the water.

In some embodiments, the reservoir 105 is sealed from the environment, for example by transparent cover. In such case, the sun is still able to heat the trays, as the cover is clear/transparent, but heat is also retained by the cover and night time radiation losses from the water surface are reduced, assisting in evaporation and reduction in odour transport.

A vapour extractor may then be used to extract water vapour inside the cover which will increase the rate of evaporation at the tray water surface, and either condense the vapour into recovered water or released as vapour.

As an illustrative example, the cover may comprise a clear roof with a central plenum, and vapour extractor fans linked with a vapour condensation system. The vapour condensation system may then be linked to water collection tanks, enabling the water to be stored for later use.

According to certain embodiments, the system 100 may include multiple layers of trays, e.g. a top layer of trays and a lower layer of trays. The top layer of trays may be used for initial heating concentration, whereas the lower trays used for subsequent concentration.

The concentrated hypersaline brine/sludge which is removed using the concentrate removal module 130 may be stored in holding tanks, transported or further processed, as required. In particular, the brine may be crystallised using other processes, either on-site or off-site. In any event, as the brine is more highly concentrated, the brine may be transported more efficiently than the contaminated water entering the system 100.

In case of organic materials, further dewatered may be achieve using, for example, natural draining from mounded rows of concentrate, by compaction (e.g. using modified tip truck units), or by using belt presses, with or without vacuum or centrifuge.

According to certain embodiments, a plurality of systems 100 may be coupled in series. For example, a concentrate removal module 130 from a first system 100 may be coupled to a water supply 110 of a second system 100. In such case, the brine may be increasingly concentrated as it is transferred between systems 100.

According to certain embodiments, a servicing pontoon is provided in the reservoir 105. The servicing pontoon enables a worker to access the trays 115, for maintenance and repair, or for cleaning and removal of debris and foreign objects. This is particularly advantageous if the liquid includes organic matter which may block ports, outlets or channels of the trays 115.

Figure 2:
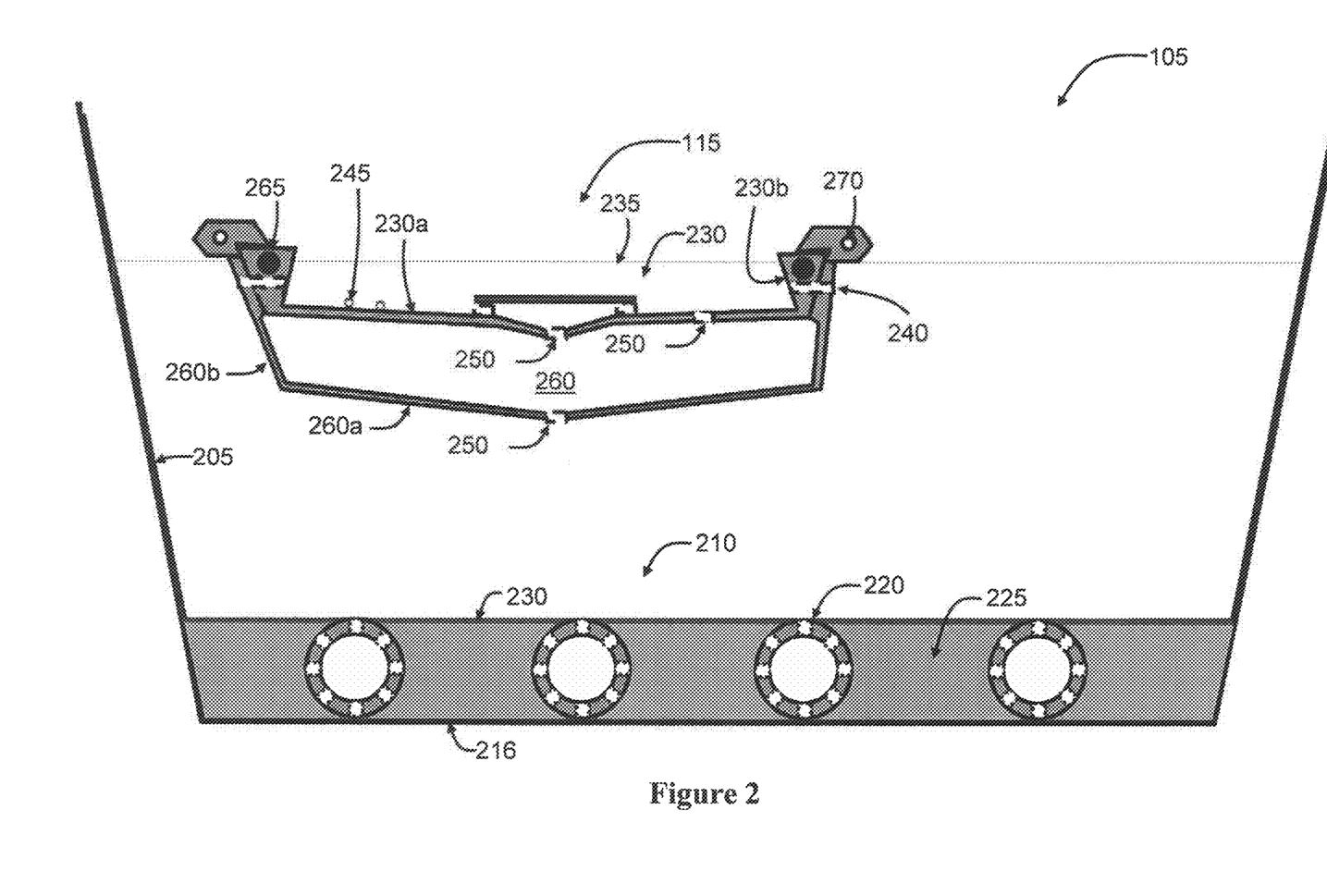
FIG. 2 illustrates a side cross-sectional view of a reservoir, of the evaporation system of FIG. 1, according to an embodiment of the present invention.

FIG. 2 illustrates a side cross-sectional view of a reservoir 105, of the evaporation system 100, according to an embodiment of the present invention. The reservoir 105 is illustrated with a single tray 115 therein for the sake of simplicity, but the skilled addressee will readily appreciate that a number of trays may extend across the reservoir 105, side by side forming a grid, or in any suitable arrangement.

The reservoir 105 comprises sidewalls 205, which extend upwardly from a base 210. The base 210 comprises a non-permeable base portion 215, to prevent the waste water from seeping out into the environment, and a plurality of concentrate removal tubes 220 there above, to remove concentrated brine that has aggregated thereon.

The concentrate removal tubes 220 are porous, and are for retrieving concentrated mineralized water, brine and/or organic waste/materials by suction. The tubes 220 may have a high specific gravity.

Filtration media 225 is provided around the concentrate removal tubes 220, and provides coarse filtration of the concentrate prior to reaching the concentrate removal tubes 220. A mesh retainer 230 holds the filtration media 225 in place, and also functions as a barrier, preventing damage to the tubes 220 by objects falling into the reservoir 105.

The trays 115 include a heating chamber 230, comprising a base 230a and sidewalls 230b, which is configured to receive contaminated water 235 and heat the water to enhance evaporation thereof.

The sidewalls 230b include a water inlet conduit 240, which enables water to flow from the reservoir 105 into the heating chamber 230. This ensures that water inside the heating chamber 230 is in equilibrium with water in the reservoir, which assists in stability of the tray 115, and helps maintain a constant level of water in the heating chamber.

Water inlet conduits 240 may be spaced at regular intervals along the tray 115, to provide even flow of water into the tray.

The heating chamber 230 further includes a bubbler tubes 245, that extend along the base 230a and are configured to aerate the water with ambient temperature air in the heating chamber 230. In particular, the bubbler tubes 245 are coupled to the aerator 125, which provides air thereto. The bubbler tubes 245 advantageously have a number of very small apertures along their length, to provide small or micro-bubbles to the water in the heating chamber 230.

The bubbler tubes 245 are illustrated as being circular in cross section, however the skilled addressee will readily appreciate that any suitable cross section may be used.

The base 230a is angled downwards towards a centre of the tray 115, to promote movement of crystallised material/salts to the appropriate position in the tray. A transfer channel 250 is located at an appropriate portion of the tray, to enable the crystalline materials, or otherwise concentrated brine, to flow out of the heating chamber 230.

The transfer channels 250 may be placed at intervals of the tray 115, and may also be placed away from the centre of the tray 115, to provide additional transfer of concentrated brine or crystalline material out of the tray. The transfer channels 250 can be open apertures, enabling bi-directional flow, one way valves, or mechanical release valves.

The tray further may include a lower chamber 260, beneath the heating chamber 230, which may enhance seasonal surface evaporation rates. The lower chamber 260 also comprise a base 260a, and sidewalls 260b, similar to the heating chamber, and with a central transfer channel 250, enabling concentrated brine to flow out of the lower chamber and into the reservoir 105.

The heating chamber 230 and the lower chamber 260 are connected through mechanical interlocking system. However, the skilled addressee will readily appreciate that fasteners or chemical bonding may alternatively be used to secure the heating chamber 230 and the lower chamber 260.

The bases 230a and 260a may include undulating or raised sections, such as fins, channels, piping or the like, to assist in directing the concentrated brine and crystalline materials to the transfer channel 250.

The trays 115 further include ballast piping 265, to further regulate buoyancy. The ballast piping may include a solid, liquid or gas based ballast, and may be of any suitable shape, including circular, ovoid, square, triangular or a bundled piping arrangement.

Finally, the trays 115 include eyelets 270, for linking adjacent trays. As discussed above, wires, piping or all weather marine ropes may be used to retain the inter-linked trays 115 on any evaporative surface under all weather conditions. Retaining wires/piping/ropes may be attached to dam, tank or pool walls such that trays could move freely up or down with changing reservoir water levels. Parallel rows of continuous or inter-linked trays across a reservoir evaporative surface may be arranged so that a water craft for tray cleaning or system repair could provide efficient access. The eyelets 270 provide an anchor point for such wires/piping/ropes, and enable them to be held in place.

FIGS. 3-6 illustrate alternative tray structures, similar to the trays 115, which may be used with the system 100, or similar systems thereto.

Figure 3:
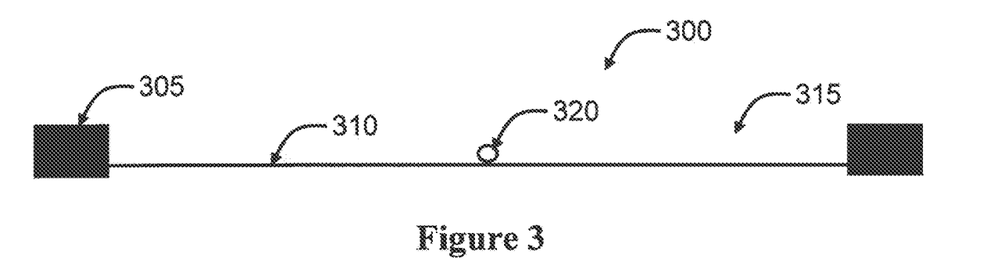
FIG. 3 illustrates a cross sectional view of a tray of an evaporation system, according to a first alternative embodiment of the present invention.

FIG. 3 illustrates a cross sectional view of a tray 300, according to a first alternative embodiment of the present invention.

The tray includes sidewalls 305, and a base 310 extending between the sidewalls 305 to define a heating chamber 315. The base 310 is substantially planar.

The sidewalls 305 may include an inlet port, ballast, retaining eyes and the like, as illustrated above with reference to FIG. 2.

An air inlet 320 is provided at the base 310, for providing air (bubbles) at ambient temperature to the heating chamber 315. The bubbles add mechanical and kinetic energy to the system assisting with circulation of water in tray and in increased evaporative surface area at the liquid surface/atmosphere interface, and multiple air emitters may be provided along the base 310.

Figure 4:
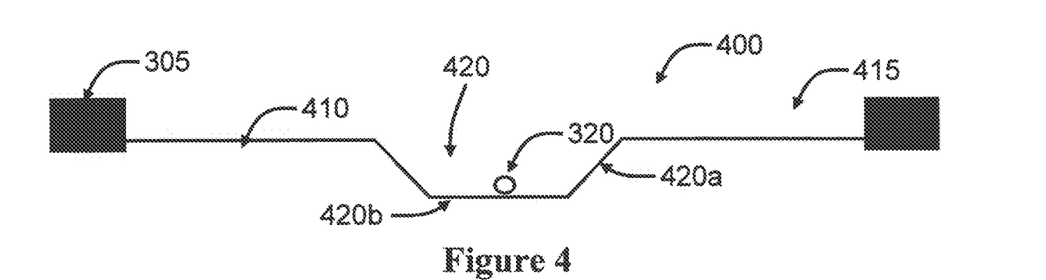
FIG. 4 illustrates a cross sectional view of a tray of an evaporation system, according to a second alternative embodiment of the present invention.

FIG. 4 illustrates a cross sectional view of a tray 400, according to a second alternative embodiment of the present invention. The tray 400 is similar to the tray 300, and includes sidewalls 305 (like tray 300), and a base 410 extending between the sidewalls 305 to define a heating chamber 415.

The base 410 is substantially planar near the sidewalls 305, but includes a sub-tray portion 420 in a central portion of the tray 400. The sub-tray portion 420 comprises angled sidewalls 420a, and a planar base portion 420b, parallel with the outer portions of the base 410, thus forming a step down from the sidewalls 305.

The air inlet 320 is located on the planar base portion 415b, i.e. at a lower portion of the heating chamber 415.

Figure 5:
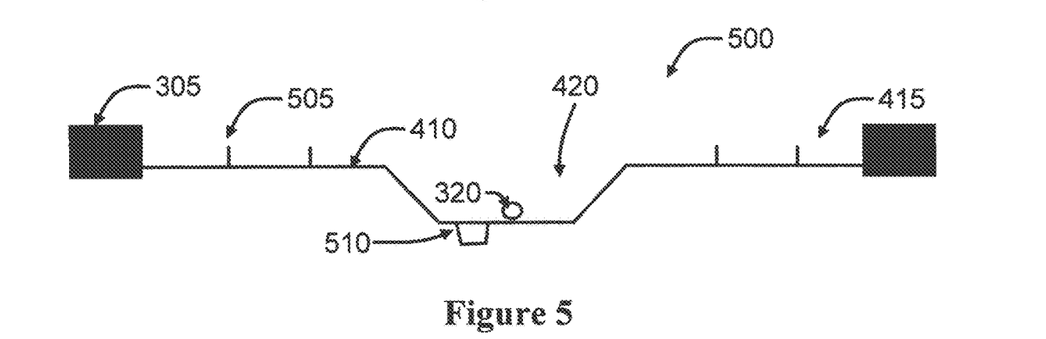
FIG. 5 illustrates a cross sectional view of a tray of an evaporation system, according to a third alternative embodiment of the present invention.

FIG. 5 illustrates a cross sectional view of a tray 500, according to a third alternative embodiment of the present invention. The tray 500 is similar to the tray 400, and includes sidewalls 305, like those of the trays 300 and 400, and a base 410, including a sub-tray portion 415, extending between the sidewalls 305 to define a heating chamber 415.

The tray 500 includes, however, fins 505 that extend upwardly from the base 410. The fins can vary in orientation, continuity or height to allow for additional heating of the water, but may also provide structural stability or simplify the management of trays. The base unit can be substantially planar or sloping depending on required orientation of fins, and while the cross section of the tray 500 is illustrated as being level, the skilled addressee will readily appreciate that the base may generally slope towards a central area of the tray. Similarly, the fins 505 may include ports or gaps, to enables the flow of crystalline material or hypersaline solution laterally across the tray.

The tray 500 also include an exit port 510, on the base portion 415b, to assist with salt/crystalline material/hypersaline solution removal or water management. The base unit can be substantially planar or sloping depending on required orientation of removal system.

Figure 6:
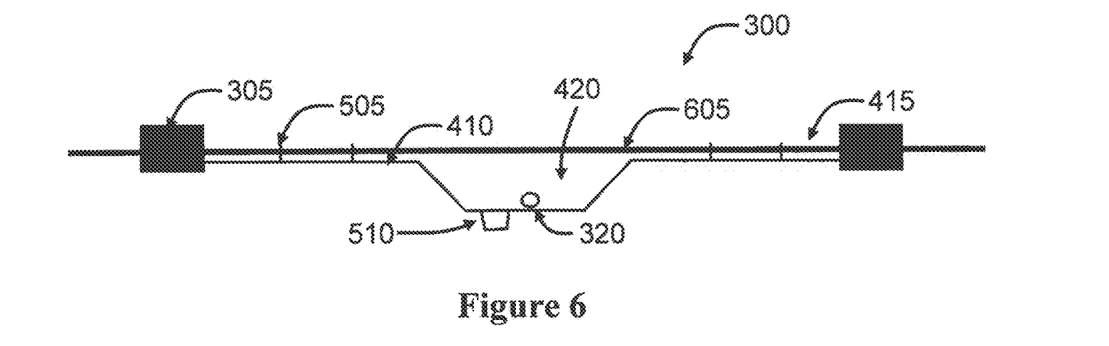
FIG. 6 illustrates a cross sectional view of a tray of an evaporation system, according to a fourth alternative embodiment of the present invention.

FIG. 6 illustrates a cross sectional view of a tray 600, according to a fourth alternative embodiment of the present invention. The tray 600 is similar to the tray 500, and includes sidewalls 305, like those of the trays 300, 400 and 500, and a base 410, including a sub-tray portion 415, extending between the sidewalls 305 to define a heating chamber 415.

The tray 600 also include a structural support member 605, which extends between fins 505, to provide structural support to the tray 600.

The structural support 605 may also support flotation aids, additional air input ports, externally heated water inflow/recycling systems (to additionally heat water in the heating chamber), or any other piping, water or air pumping, cabling, heat conducting materials and or solar energy collector systems as required.

The system described above is particularly suited for primary treatment of brines of up to 300,000 mg/L Total Dissolved Solids (TDS) from industrial or environmental sources such as saline groundwater, leachate collection systems or mining/industrial waste waters. Similarly, waste water having an organic material dry matter content that ranges from 3% to 50% is also suited to the system 100, with an output of between about 40% to 70% organic material on a dry matter basis.

Advantageously, the system 100 enables improved evaporation of mineralised water, slurries and the like. In particular, the system provides a low cost accelerated evaporation of low to highly mineralised waters through to higher TDS concentration brines, which is significantly less expensive than prior art technologies, such as thermal, membrane distillation or reverse osmosis.

As a result, transport, processing and storage costs are reduced, which may allow the concentrate to be cost effectively transported longer distances than the original mineralised water. In the case of organic matter for use as a fertiliser, this reduces the cost of fertiliser transport, which may make sources of fertilizer available that were not previously.

Furthermore, evaporation of water may be faster, reducing the risk of environmental issues caused by dangerous contaminants, maintaining a free board in dams during periods of high rainfall, and/or preventing leaking from under-specified reservoirs and potentially entering shallow aquifers.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An evaporation system including:
   a reservoir, for receiving a liquid mixture to be reduced through evaporation; and
   a tray, for being received in the reservoir, the tray defining a heating chamber into which the liquid from the reservoir may flow, the heating chamber configured to heat the liquid therein to increase evaporation of the liquid,
   wherein the heating chamber includes an inlet on a side of the heating chamber for receiving liquid from the reservoir, and
   the tray includes one or more floating elements, whereby the tray is configured to float in the liquid in the reservoir.

2. The evaporation system of claim 1, wherein the liquid mixture comprises a saline solution.

3. The evaporation system of claim 2, wherein the liquid mixture comprises water including salts in solution and in solid state.

4. The evaporation system of claim 1, wherein the liquid mixture comprises a mixture of water and organic matter.

5. The evaporation system of claim 1, wherein the reservoir comprises a dam, a tank, a pool or a natural system that can contain water.

6. The evaporation system of claim 1, wherein the reservoir is outdoors.

7. The evaporation system of claim 1, wherein the reservoir has a surface area of more than 1,000 m2.

8. The evaporation system of claim 1, wherein the heating chamber is configured to heat the liquid therein using solar radiation.

9. The evaporation system of claim 1, wherein the solar radiation heats the liquid directly.

10. The evaporation system of claim 1, wherein the heating chamber comprises a solar thermal collector configured to heat the liquid.

11. The evaporation system of claim 10, wherein the solar thermal collector is submerged in the liquid, to heat the liquid directly.

12. The evaporation system of claim 10, wherein the solar thermal collector comprises a surface of the heating chamber.

13. The evaporation system of claim 10, wherein the solar thermal collector comprises a base and/or sidewalls of the heating chamber.

14. The evaporation system of claim 10, wherein the solar thermal collector comprises a plurality of fins, extending upwardly from a base of the heating chamber.

15. The evaporation system of claim 10, wherein the solar thermal collector comprises a dark, solar absorbing surface of the heating chamber.

16. The evaporation system of claim 10, wherein the heating chamber is formed of dark material such that the heating chamber itself defines the solar thermal collector.

17. The evaporation system of claim 10, wherein the heating chamber is coated with a dark material to define the solar thermal collector on a surface thereof.

18. The evaporation system of claim 1, wherein the heating chamber is longer than it is deep.

19. The evaporation system of claim 1, wherein the heating chamber is wider than it is deep.

20. The evaporation system of claim 1, wherein the heating chamber is longer and wider than it is deep.

21. The evaporation system of claim 1, wherein the heating chamber is less than about 10 cm deep.

22. The evaporation system of claim 1, wherein the heating chamber includes an outlet, for allowing crystalline material, particles or concentrated liquid to escape from the heating chamber.

23. The evaporation system of claim 22, wherein the outlet is coupled back to the reservoir.

24. The evaporation system of claim 22, wherein the outlet is on a lower portion of the heating chamber.

25. The evaporation system of claim 22, wherein the outlet is configured to direct crystalline material, particles or concentrated liquid towards a base of the reservoir.

26. The evaporation system of claim 22, wherein the heating chamber is configured to guide crystalline material or solids towards the outlet.

27. The evaporation system of claim 1, wherein the tray includes a ballast element, to provide stability to the tray in the liquid.

28. The evaporation system of claim 1, including one or more retainers, for keeping the tray in place in the reservoir.

29. The evaporation system of claim 1, wherein the heating chamber is defined by outer walls of the tray.

30. The evaporation system of claim 1, wherein the tray comprises a substantially planar base.

31. The evaporation system of claim 1, comprising a plurality of trays.

32. The evaporation system of claim 1, including a heater, for heating the liquid.

33. The evaporation system of claim 32, wherein the heater is configured to heat the liquid through recirculation.

34. The evaporation system of claim 32, wherein the heater is configured to pre-heat the liquid.

35. The evaporation system of claim 32, wherein the heater is configured to heat liquid in heating chamber.

36. The evaporation system of claim 32, wherein the heater is configured to store thermal energy, and use the thermal energy at a later time.

37. The evaporation system of claim 32, wherein the heater comprises a network of tubes/piping.

38. The evaporation system of claim 32, wherein the heater comprises a solar heat sink.

39. The evaporation system of claim 1, including an aerator, for aerating the liquid.

40. The evaporation system of claim 39, wherein the aerator is configured to provide ambient air to the heating chamber.

41. The evaporation system of claim 39, wherein the aerator comprises a device to produce air at pressures elevated above ambient or atmospheric pressure.

42. The evaporation system of claim 1, comprising a concentrate removal module, configured to remove concentrate from the reservoir.

43. The evaporation system of claim 42, wherein the concentrate removal module is configured to remove concentrate from the floor of the reservoir.

44. The evaporation system of claim 42, wherein the concentrate removal module may comprise one or more pipes on the reservoir floor configured to remove the concentrate by suction.

45. The evaporation system of claim 42, wherein the concentrate removal module comprises a mechanical removal system.

46. The evaporation system of claim 1, further including a roof, for preventing rainwater from entering the reservoir.

47. The evaporation system of claim 46, wherein the roof is transparent.

48. The evaporation system of claim 1, including a cover, for covering the reservoir.

49. The evaporation system of claim 48, wherein the cover encloses the reservoir.

50. The evaporation system of claim 1, including a vapour removal module, for removing vapour.

51. The evaporation system of claim 50, including a vapour condensation module, for condensing the vapour.

\* \* \* \* \*